United States Patent [19]
Herbst et al.

[11] Patent Number: 6,018,162
[45] Date of Patent: Jan. 25, 2000

[54] SYSTEM WITH MOTION DETECTION SCENE-BASED NON-UNIFORMITY CORRECTION

[75] Inventors: Stephen J. Herbst, Redondo Beach; Jeffrey E. Orr, Cypress; Weston K. Furukawa, Los Angeles, all of Calif.

[73] Assignee: HE Holdings, Inc., Los Angeles, Calif.

[21] Appl. No.: 08/616,145

[22] Filed: Mar. 14, 1996

Related U.S. Application Data

[60] Provisional application No. 60/002,686, Sep. 29, 1995.

[51] Int. Cl.[7] .............................. H01L 25/00; G02B 26/10
[52] U.S. Cl. ............................................ 250/332; 250/334
[58] Field of Search .................................. 250/332, 334, 250/252.1 A, 370.08, 349

[56] References Cited

U.S. PATENT DOCUMENTS

5,302,824   4/1994   Prager ...................................... 250/332

*Primary Examiner*—David P. Porta
*Assistant Examiner*—Richard Hanig
*Attorney, Agent, or Firm*—Gordon R. Lindeen, III; Michael W. Sales; Wanda K. Denson-Low

[57] ABSTRACT

A system for correcting detector array channel signal output level non-uniformities in a thermal imaging system. The non-uniformity correction system includes a target scene detector (27) having an array of detector elements (26a, 26b) responsive to energy from a detected target scene (14) and including a plurality of associated output channels (31, 32). The system includes a memory (62) for storing non-uniformity correction commands and a processor (82) operative to implement the non-uniformity commands in response to detected non-uniformities in the output channels signal. The system also includes a non-uniformity corrector (60) for adjusting the level of the output channels in response to commands from the processor (82).

10 Claims, 7 Drawing Sheets

SYSTEM WITH MOTION DETECTION SCENE-BASED NON-UNIFORMITY CORRECTION

This application is based on Provisional application No. 60/002,686 filed Sep. 29, 1995, the priority of which is hereby claimed.

BACKGROUND OF THE INVENTION

1. Technical Field

The present invention relates generally to thermal imaging systems, and in particular to a system for digitally correcting any channel-to-channel voltage level variations present in a scanning thermal imaging system, thereby ensuring a high quality output video signal.

2. Discussion

Scanning thermal imaging systems are used in a variety of applications, including surveillance systems and target detection/recognition systems. Such systems typically incorporate a telescopic lens assembly coupled to a scanner. The scanner scans energy from a scene through an imager lens assembly onto a detector array having a plurality of photo-electrically responsive detector elements perpendicular to the scan direction. Each of these detector elements provides an electric signal proportional to the flux of infrared light on the particular detector element. Electric signals generated from the detector elements are subsequently processed by system sensor electronics to create an image that is displayed on a system output device. To improve sensitivity, some of these systems incorporate detectors parallel to the scan direction. The output of these detectors are delayed in time from each other such that, ideally, the scanned image is output simultaneously on all of the parallel detectors. The delayed outputs are then summed (integrated). This process is referred to as time delay and integrate (TDI).

In the above-mentioned thermal imaging system detector arrays, it is essential that the multiplexed detector array channels have an associated voltage gain and voltage level that is uniform with all other channels to ensure the quality of the signal that is input into the system electronics for processing. However, each channel may have an associated DC offset variation that causes it to differ from the other channel DC offsets.

Many Presently implemented systems for correcting channel-to-channel non-uniformity require a thermal reference source in the optical path. All of the detectors must be able to view this thermal reference source at a time that the detectors are not viewing the scene. This requirement adds cost and complexity to the opto-mechanical system. To provide optimum correction, the thermal reference source must be at the scene temperature; therefore, it must be able to be cooled and heated by additional electronics that add cost and complexity to the system. Since the scene can have many different temperatures, the correction will only be valid around the temperature of the thermal reference source or multiple sources are required with additional cost and complexity. What is needed, then, is a non-uniformity correction system that uses only scene information to determine the correction values. Moreover, for many applications, this scene based non-uniformity correction must work in the presence of scene motion.

SUMMARY OF THE INVENTION

In accordance with the teachings of the present invention, a scene-based non-uniformity correction system is provided for use in thermal imaging applications to correct variations in the voltage level of detector array channel outputs in the digital realm, thereby enhancing video output signal quality. The scene-based non-uniformity correction system of the present invention is designed to minimize any non-uniformity artifacts caused by scene motion. The system of the present invention therefore eliminates certain hardware components required for implementation of analog systems, thereby reducing overall system cost and complexity.

In particular, the present invention provides a system for correcting signal output level non-uniformities of each array channel in a thermal imaging system based only on scene information. The non-uniformity correction system includes a target scene detector having an array of detector elements responsive to energy from the detected target scene, with the array having a plurality of associated channels. The system includes a memory for storing non-uniformity correction data and a processor operative to implement the non-uniformity data in response to detected non-uniformities in the signal. The system also includes a non-uniformity corrector for adjusting the level of the signal output from the detector element channels in response to adjustment commands from the processor.

BRIEF DESCRIPTION OF THE DRAWINGS

Other objects and advantages of the invention will become apparent upon reading the following detailed description and upon reference to the drawings, in which.

DETAILED DESCRIPTION OF THE PREFERRED EMBODIMENT

The following description of the preferred embodiments is merely exemplary in nature and is in no way intended to limit the invention or its application or uses.

Figure 1:
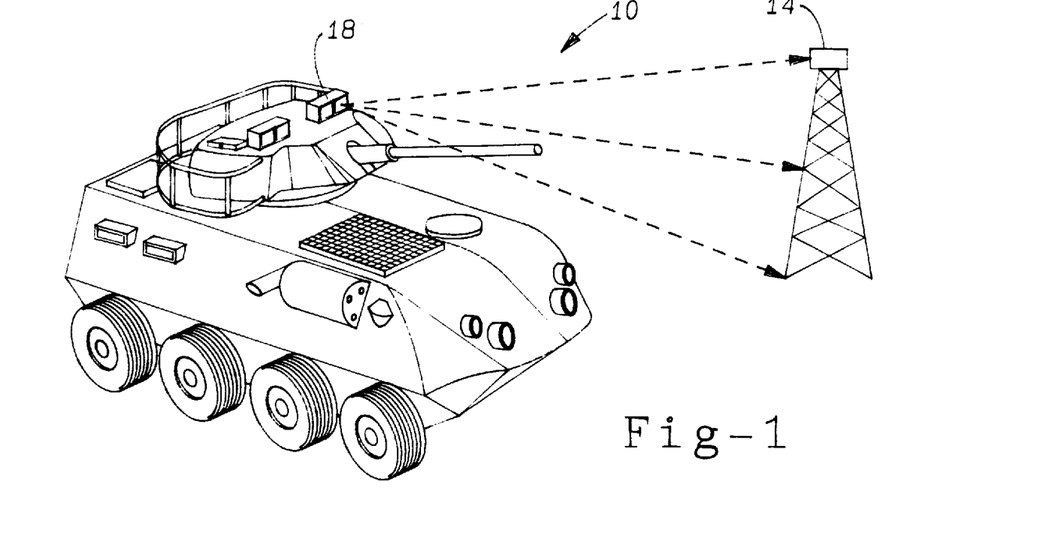
FIG. 1 illustrates an LAV-25 light armored vehicle in which the present invention may be implemented.
Figure 2:
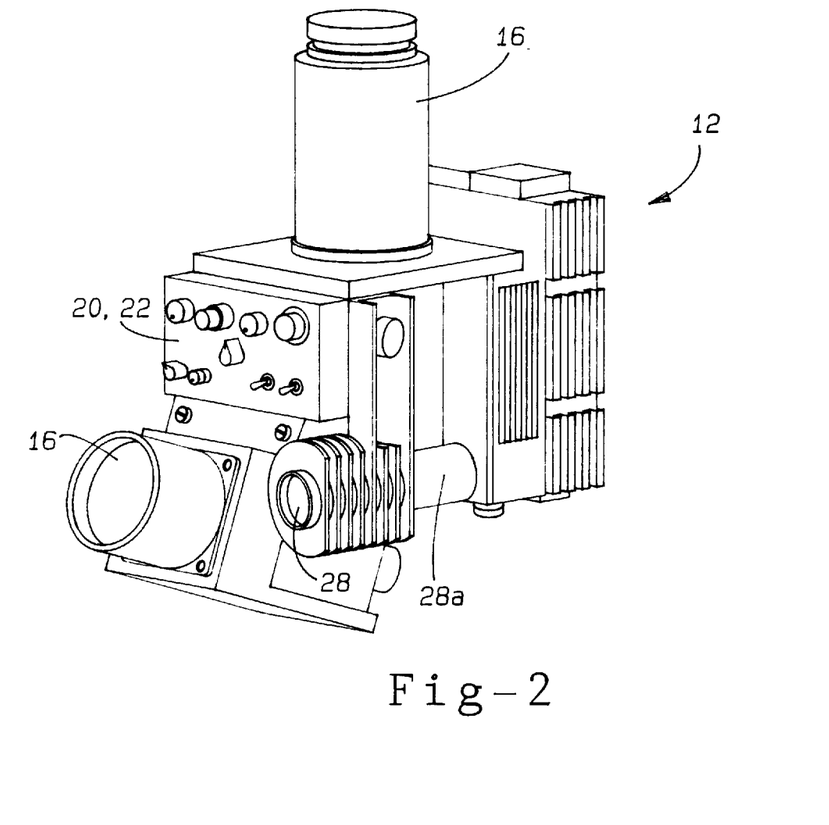
FIG. 2 is a perspective view of a thermal imaging system unit in which the preferred embodiment of the present invention is implemented.

Referring to the drawings, FIG. 1 shows an LAV-25 light armored vehicle 10 in which the preferred embodiment of the present invention is implemented. As shown in FIGS. 1 and 2, the present invention is implemented as part of a thermal imaging unit 12, which processes energy reflected from a detected target scene 14 back through a system telescope assembly 16 coupled to an externally mounted head mirror 18.

Preferably, the thermal imaging unit 12 is a Hughes Infrared Equipment (HIRE) thermal imaging sensor unit.

The HIRE unit is a high performance light weight modular fire control sight and thermal imaging system that is capable of providing superior vision capability through total darkness, smoke, dust, and other types of adverse conditions. The HIRE system may be implemented in a wide variety of environments, including in a variety of armored vehicles, such as the LAV-25, Piranha, Desert Warrior, and LAV-105. The thermal imaging unit 10 provides stand alone thermal imaging capability, but can also be configured for use with TOW missile fire control systems. The unit incorporates several commercially available major components, thereby reducing logistics requirements through commonality of such things as repair facilities, support equipment, training programs and spare parts. The EFL compensator of the present invention enables the thermal imaging sensor unit to provide a significant improvement in imaging unit image quality and range performance over conventional thermal imaging systems as will now be described.

Referring to FIGS. 1–5, the telescope assembly 16, through which target searching and sighting functions are achieved, is implemented in a protected environment within the vehicle 10. Preferably, the telescope assembly 16 may be selectively switched to either a narrow field of view or a wide field of view as desired through switches on the gunner and commander control panels 20, 22. The head mirrors 18 are implemented to relay a detected scene to the telescope assembly 16. Subsequent to target scene thermal energy signal being processed by the thermal imaging unit, as will be described below, the scene is viewed through a gunner display 19 operatively coupled to a display control panel 20 and a commander display 21 coupled to a commander display control panel 22.

Figure 3:
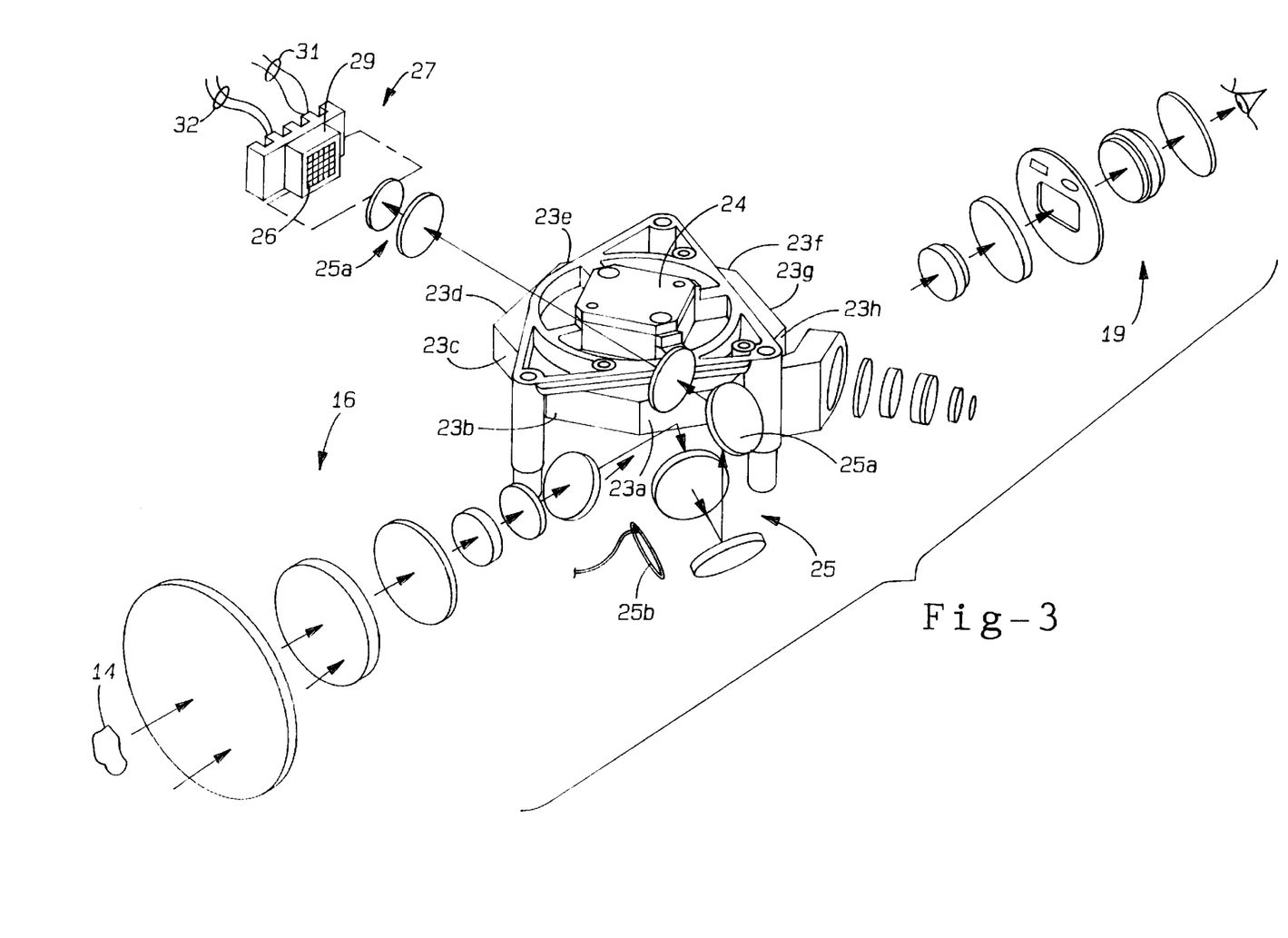
FIG. 3 is a partial exploded view of the thermal imaging system shown in FIG. 2.

As shown in FIG. 3, energy from the detected scene is transmitted through the thermal imaging unit 12 to a polygonal, mirrored scanner 23 rotated by a scanner motor 24. The scanner includes 8 facets 23a–23h, each of which is cut at an angle to effect displacement of the scanned scene energy on the detector array by a discrete amount. The cut and displacement effected by each facet is shown below:

TABLE I

| FACET | CUT | DETECTOR ARRAY ENERGY DISPLACEMENT (IN PIXELS) |
|---|---|---|
| 23a | Normal | 0 |
| 23b | Interlaced | — |
| 23c | Down | −1 |
| 23d | Interlaced | — |
| 23e | Up | +1 |
| 23f | Interlaced | — |
| 23g | Normal | 0 |
| 23h | Interlaced | — |

As the scanner rotates, the scanner mirrors reflect the scene energy at successively varying angles through an imager assembly shown generally at 25. The imager assembly includes imager lenses, such as lens 25a, which image the scene onto a detector array 26 housed within a detector assembly 27. The imager assembly 25 also includes an imager optics temperature sensor 25b for monitoring the temperature of the imager. The detector assembly 27 is housed within a dewar 28 and cooled by a cooler 28a to cryogenic temperatures.

Figure 4:
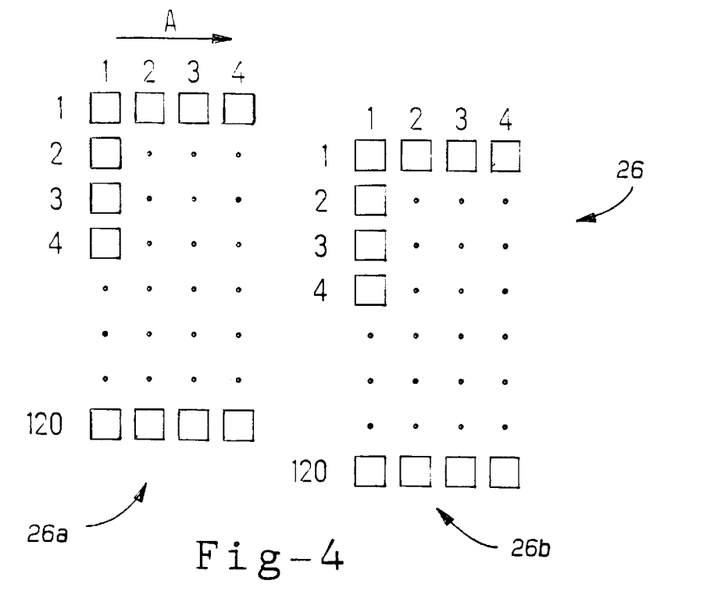
FIG. 4 illustrates the arrangement of the detector assembly elements shown partially in FIG. 3.

As shown partially in FIG. 3 and more fully in FIG. 4, the detector array 26 of the present invention consists of two staggered 120×4 subarrays 26a, 26b of detector elements, with each element being sensitive to light in the infrared spectrum and each having a detector element output. As the scanner scans the image of the scene across the detector in the direction indicated by the arrow A shown in FIG. 4. The output of each detector element is input to a readout integrated circuit (ROIC) 27a (FIG. 5) associated with the detector assembly which samples the output, provides the time delay and integration (TDI) of the four parallel detector elements in each detector element row, and multiplexes the 240 resulting TDI detector channels into 4 video output channels 31, 32, with output channels 31 carrying output signals from the first 120× 4 detector subarray 26a, and output channels 32 carrying output signals from the second detector subarray 26b.

Figure 5:
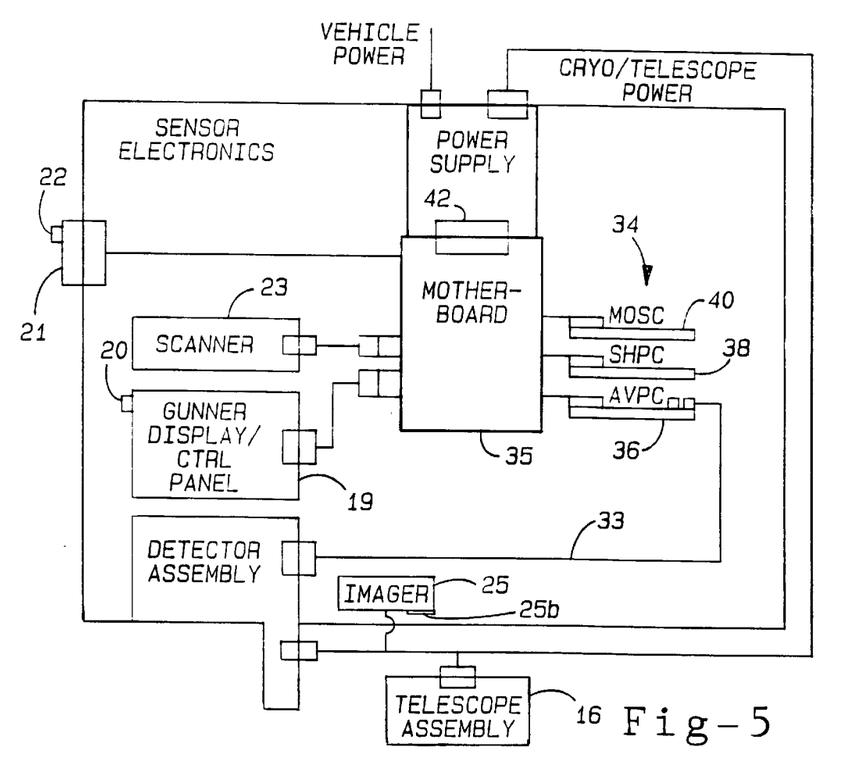
FIG. 5 is a block diagram of the thermal imaging system unit shown in FIG. 2.

Referring now to FIG. 5, operation of the imaging system components is controlled generally by the system electronics 34. The system electronics 34 are implemented on three cards coupled to a system mother board 35. The cards include an analog video processing card (AVPC) 36, a scene based histogram processor card (SHPC) 38 and a memory output symbology card (MOSC) 40. The associated functions of each of these cards will be discussed in greater detail below. Also coupled to the mother board 35 is a power supply card 42 that receives power input from the vehicle in which the system is implemented and outputs power to various system components at voltage levels required by the individual system components.

Figure 6:
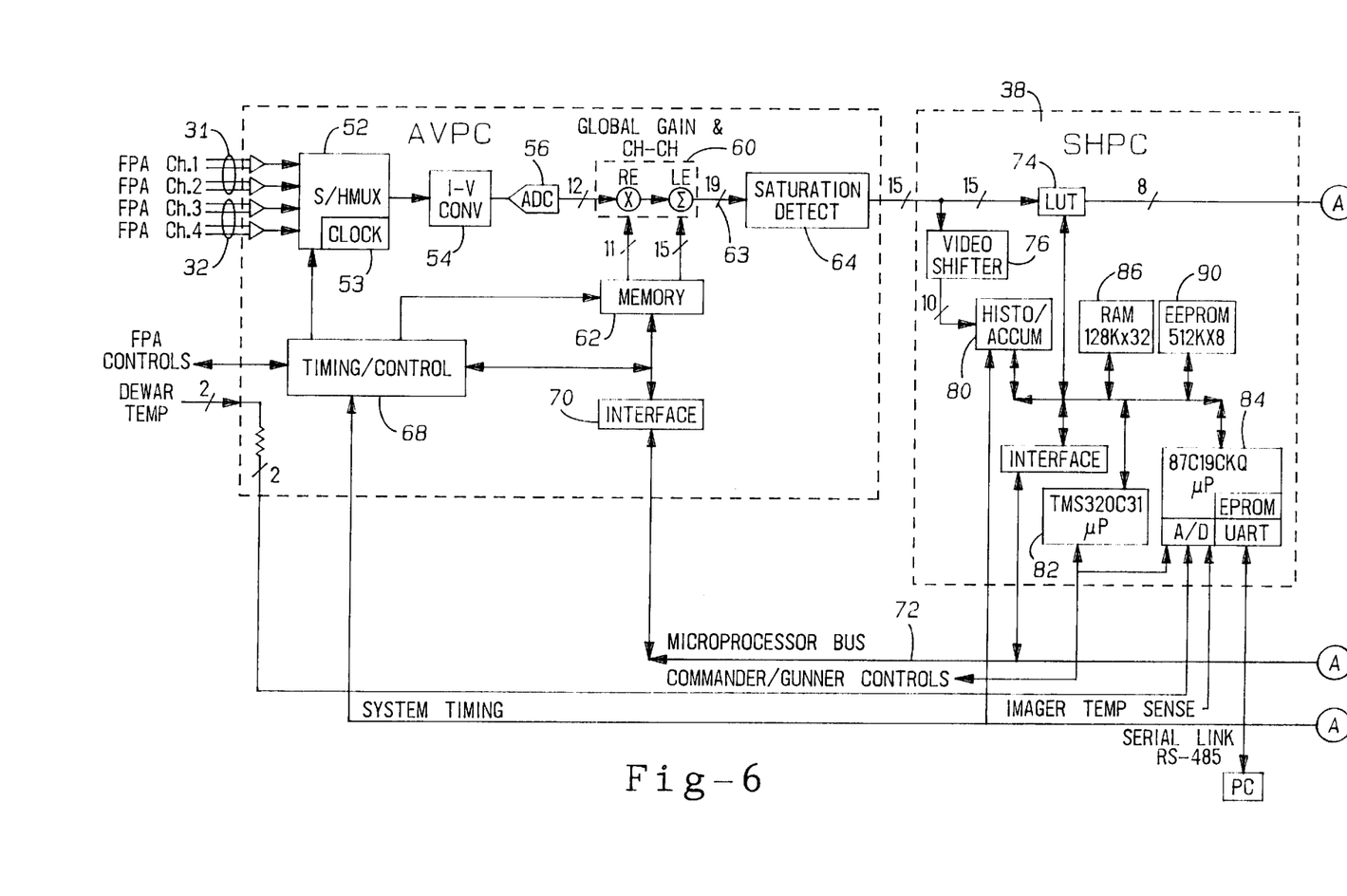
FIGS. 6–6A are block schematic diagrams of system electronics of the thermal imaging system of the present invention including the non-uniformity correction system of the present invention.
Figure 6A:
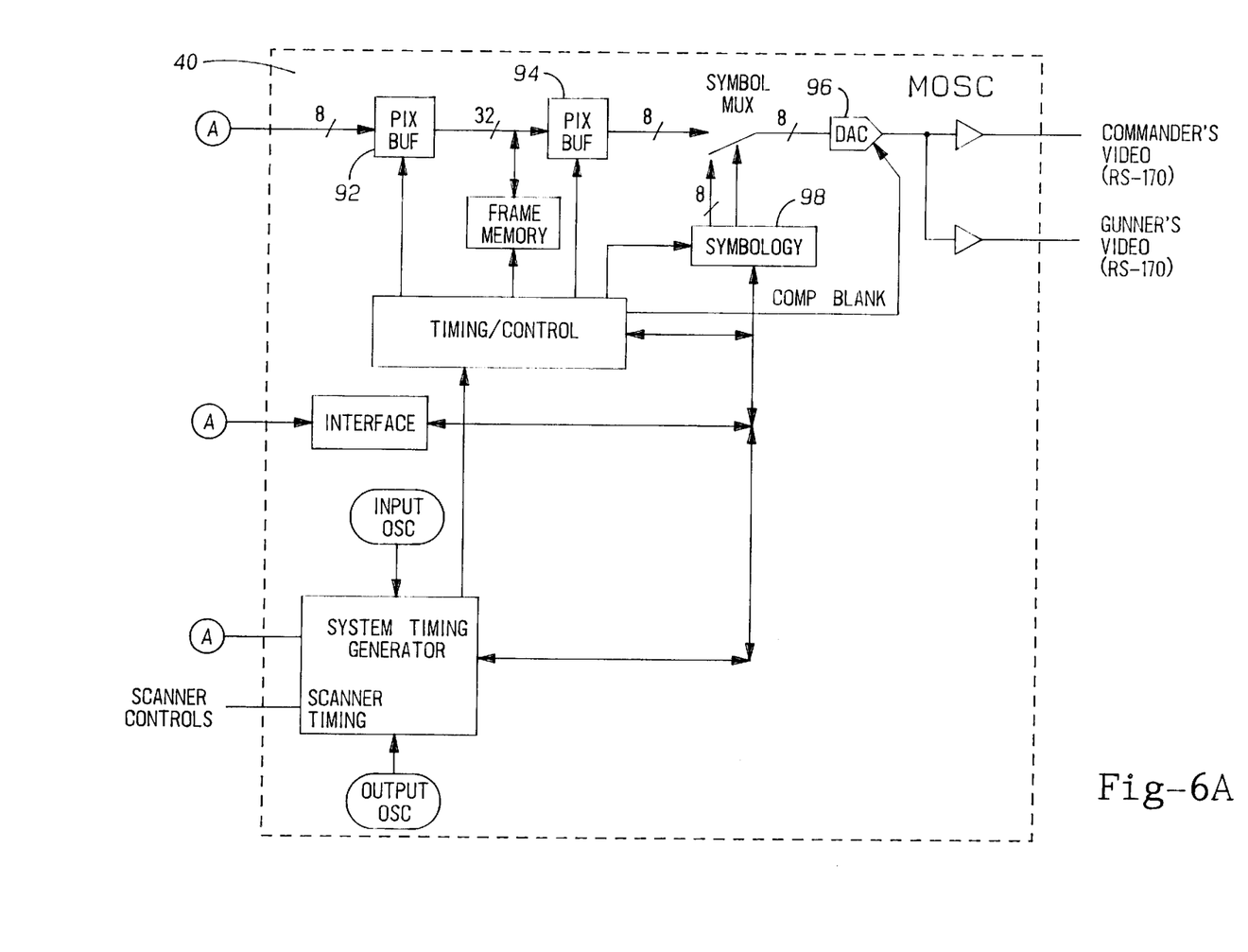

Referring now in detail to FIG. 6, an overall block diagram showing the components implemented on the three cards 36, 38 and 40 shown. Referring first to the AVPC card 36, channel outputs 31, 32 are input into an S/HMUX 52 having an associated high speed system multiplier clock (HCLK) 53. Preferably, all 960 detector elements (240 pixels) are clocked during the clock sample period. The S/HMUX 52 is preferably a HUGHES custom integrated circuit, Part No. 6364060PGA-DEV, designed to sample and further multiplex the multiplexed detector element outputs. These multiplexed signals are sampled at an adjustable sample rate. However, for further signal processing, the signals are converted to voltage signals through I-V converter 54. Once these signals are converted, the signals are digitized by an analog to digital converter 56.

After being converted into digital signals, the detector element output signals are input into a signal equalizer 60. The signal equalizer 60 adds an associated gain and level value, stored in a memory 62, for each one of the 240 detector pixel elements to correct any gain and level differences from each of the detector pixel signals so that the multiplexed digital signal output at 63 is uniform, thereby enhancing picture quality.

Still referring to the AVPC card 36, the digitized input signal (to the signal equalizer 60) is 12 bits. However, the signal equalizer, in correcting signal gain and level differences, subsequently increases the digital signal output to 19 significant bits. As the signal contains only 15 bits of usable data, saturation detector 64 sets all data above the 15 bit range to a saturation level of 1 and all data below the 15 bit range to 0. Therefore, only the useful data within the 15 bit range is output to the SHPC card 38. The AVPC card also includes a timing/control processing unit 68 implementing the clocks 53 and line timing for clocking multiplexed signals from the S/HMUX during a sample period. The AVPC card also includes an interface 70 that connects AVPC card components to a system microprocessor bus 72.

Turning now to the SHPC card 38, the signal output from the saturation detector 64 is input into a look-up table 74. Generally, the output dynamic range of the digitizing and signal equalizing process is greater than the maximum dynamic range of traditional image displays. Moreover, there are areas of the output dynamic range that have minimal or no information. Therefore, the output signal of the digitizing and signal equalizing process is input into a look-up table 74 to compress the information into display dynamic range. The look-up table provides a programmable method of mapping the larger input dynamic range into the smaller output dynamic range. The mapping can be varied continuously either based on manual input from a system operator or based on an automatic histogram-based method. Prior to the look-up table, the video is input to a histogram/accumulator 80. The histogram/accumulator 80 performs certain programmable functions, such as line summing, line grabbing, and histogramming of the digitized information. The look-up table 74 converts the 15 bit signal output from the saturation detector to an 8 bit output signal. The look-up table is preferably a 32k×8 Random Access Memory (RAM) well known in the art such as Integrated Device Technology Model No. IDT71256, and can be varied continuously either based on manual input from a system operator or based on an automatic gain algorithm. The 15 bit signal output from the saturation detector is also converted to a 10 byte signal through a video shifter 76.

Also located on the SHPC card 38 are microprocessors 82 and 84. As discussed above, many functions are under microprocessor control. The microprocessor 84 performs numerous control-related operations associated with the control panel(s), controls the TDI clock rate for EFL compensation and histogram/accumulator function, and calculates the level equalization value for each pixel, the global level control value, and the look-up table values. The microprocessor 82 performs more system-based processing related functions and is operatively associated with a RAM 86 and an EEPROM 90.

Referring now to the MOSC card 40, the 8 bit output signal from the look-up table 74 is input through pixel buffers 92, 94 and output to both the gunner display 19 and the commander display 21 after being scan-converted via a frame memory and converted back to an analog signal through the digital to analog converter 96. Symbology may also be switched in for any pixel in the image signal by symbology processor 98 before being output through the digital analog converter 96. Such symbology data may include status indications, sighting cross hairs and instructional text at the bottom of either the commander or the gunner display.

Prior to being output to the display, the digitized signal is scan converted. Generally, the scanner scans the scene horizontally; thus, the data is multiplexed along vertical columns. Standard video displays, however, require the data to be output along horizontal lines. Therefore, the digitized data must be converted from the vertical column input format to a horizontal line output format. Moreover, because of the separation between the detector subarrays, the digitized data from the subarrays are delayed in time from each other. This delay must be removed. The delay is dependent of the imager's effective focal length and, because the data is digitized, correct removal of the delays depends upon correct compensation for the image focal length changes. A compensator provides both of these functions.

Operation of the non-uniformity correction (NUC) system of the present invention will now be described. The NUC system of the present invention is implemented in a manner similar to that of the NUC system disclosed in application Ser. No. 08/524,199, entitled "Thermal Imaging Device", assigned to the assignee of the present application and incorporated herein by reference. Additionally, the NUC system of the present invention also factors in scene motion thereby increasing the overall accuracy of the thermal imaging system 12 upon movement of the target scene. The NUC system removes channel-to-channel DC offset variations in the 240 TDI detector array output channels. Channel-to-channel responsivity variations are corrected using data stored in the memory 62. The scanner facets $23a-23h$ vertically dither the scene on different fields so that, in the absence of scene motion, each detector element sees the same scene information as the adjacent detector elements. As scene information on adjacent detector array lines (different fields) does not vary, any line sum differences result from DC non-uniformities. The histogram chip 80 calculates the line sums of the signal equalizer 60 output, $sum_k(i)$, where i is the channel number $1 \leq i \leq 240$ and k=u for the up facets, k=n for the normal facets, and k=d for the down facets.

The following description represents a preferred method of implementation of the logic of the NUC system of the present invention. Preferably, the logic is programmed into the memory 62 and is read by the processor 82 to control operation of the signal equalizer 60, the histogram 80, and the FPGA 100, and other system hardware components integral in implementing the NUC system.

The NUC system uses the center channel as a reference. Changing the center channel correction value causes an equivalent change in all of the other correction values. The center channel correction value is initialized at the signal equalizer 60 once the detector is cooled down to midscale:

$$LE(120) = midscale$$

Line sums collected by the histogram chip from adjacent detector array channels are substituted for dead channels:

$$\text{If channel i is dead then } sum_k(i) = sum_k(i \pm 1)$$

Figure 8:
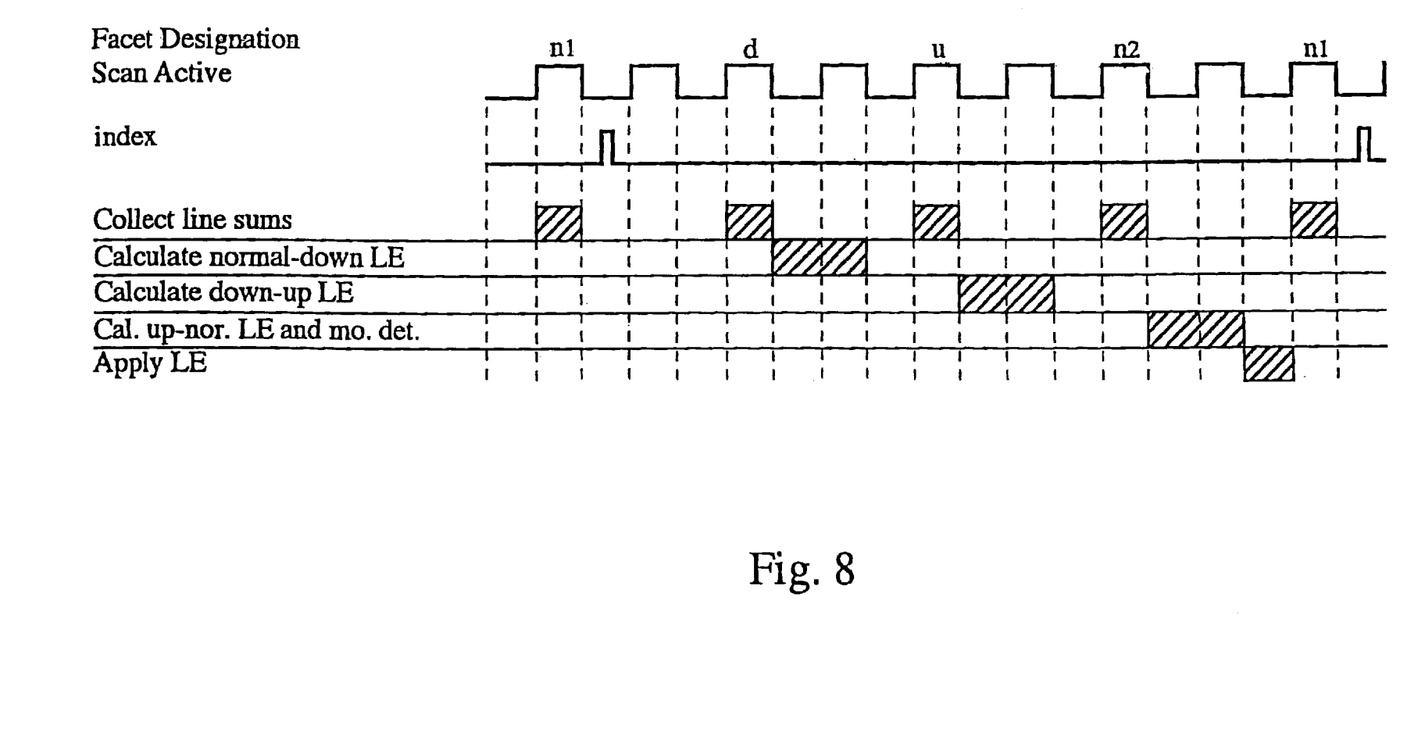
FIG. 8 is a time line for the non-uniformity connection system.

There are three different scanner facet comparisons possible: up to normal, normal to down, and up to down. The up to down comparisons allows the NUC system to skip over dead channels. Only the up to down and one of the other two comparisons are necessary for proper operation of the NUC system. A time line for the NUC system is shown below in FIG. 8. Index is a scanner output that occurs once per revolution.

The NUC system is based upon the scanner facet order above and the predicated image orientation of the detector channels of:

| UP | NORMAL | DOWN |
|-----|--------|------|
| 1 | | |
| 2 | 1 | |
| 3 | 2 | 1 |
| . | . | 2 |
| . | . | . |
| . | . | . |
| 239 | 239 | . |
| 240 | 240 | 239 |
| | | 240 |

For normal-down scanner facet transitions:
cum diff=0
For i=119 to 1
   diff=$sum_{n1}$ (i+1)−$sum_d(i)$
   cum diff=cum diff+diff dLE$_{nd}$(i)=cum diff/N
Next i
cum diff=0
For i=121 to 240
   diff=sum$_d$ (i−1)−sum$_n$(i)
   cum diff=cum diff+diff
   dLE$_{nd}$(i)=cum diff/N
Next i
For the down-up scanner facet transition:
cum diff even=0
cum diff odd=0
For i=119 to 1
   diff=sum$_u$ (i +2)−sum$_d$(i)
   For even i
      cum diff even=cum diff even+diff
      dLE$_{du}$(i)=cum diff even/N
   For odd i
      cum diff odd=cum diff odd+diff
      dLE$_{du}$(i)=cum diff odd/N
Next i
   cum diff even=0
   cum diff odd=0
   For i=122 to 240
   diff(i)=sum$_d$ (i−2)−sum$_u$(i)
   For even 1
      cum diff even=cum diff even+diff
      dLE$_{du}$(i)=cum diff even/N
   For odd i
      cum diff odd=cum diff odd+diff
      dLE$_{du}$(i)=cum diff odd/N
Next i
For up-normal scanner facet transitions:
cum diff=0
For i=119 to 1
   diff=sum$_u$ (i+1)−sum$_{n2}$(i)
   cum diff=cum diff+diff
   dLE$_{un}$(i)=cum diff/N
Next i
cum diff=0
For i=121 to 240
   diff=sum$_{n2}$ (i−1)−sum$_u$(i)−N o dLE(i)
   cum diff=cum diff+diff
   dLE$_{un}$(i)=cum diff/N
Next i
where N is the programmable number of pixels used in the line sum.

It should be appreciated at this point that the above described NUC implementation assumes that the detected target scene 14 is not moving since the correction values are determined by comparing information collected at different times. If the scene does move, the correction values may be corrupted with scene information thereby creating additional non-uniformities. To prevent this, the processor tests for scene motion by comparing the line sums of the first normal facet in the scanner revolution (n1) with the other normal facet (n2). Since the scan facets are cut at the same angle, differences in the line sums are probably due to scene motion. That is, for all channels, i, if abs[sum$_{n1}$(i)−sum$_{n2}$(i)]>motion threshold, then motion is detected. If the motion is detected then k$_{nuc}$, the non-uniformity correction loop gain, is set to a small value (1/256). The gain is not set to zero so that even if the scene is continuously moving, some correction is applied. If motion is not detected, then k$_{nuc}$ is set to a larger value (1/16) so that the correction converges relatively quickly.

The actual correction terms, LE(i), are then updated by multiplying the loop gain by the average value of the dLE terms:

$$LE(i)=LE(i)+k_{NUC}*[dLE_{nd}(i)+dLE_{du}(i)+dLE_{un}(i)]/3.$$

The processor writes these new correction values into the NUC memory 60 and the values are applied by the signal equalizer to the video. Since the histogram chip 80 is located after the signal equalizer 62, the line sums include the effects of the correction values; therefore, the process is close-looped.

Figure 7:
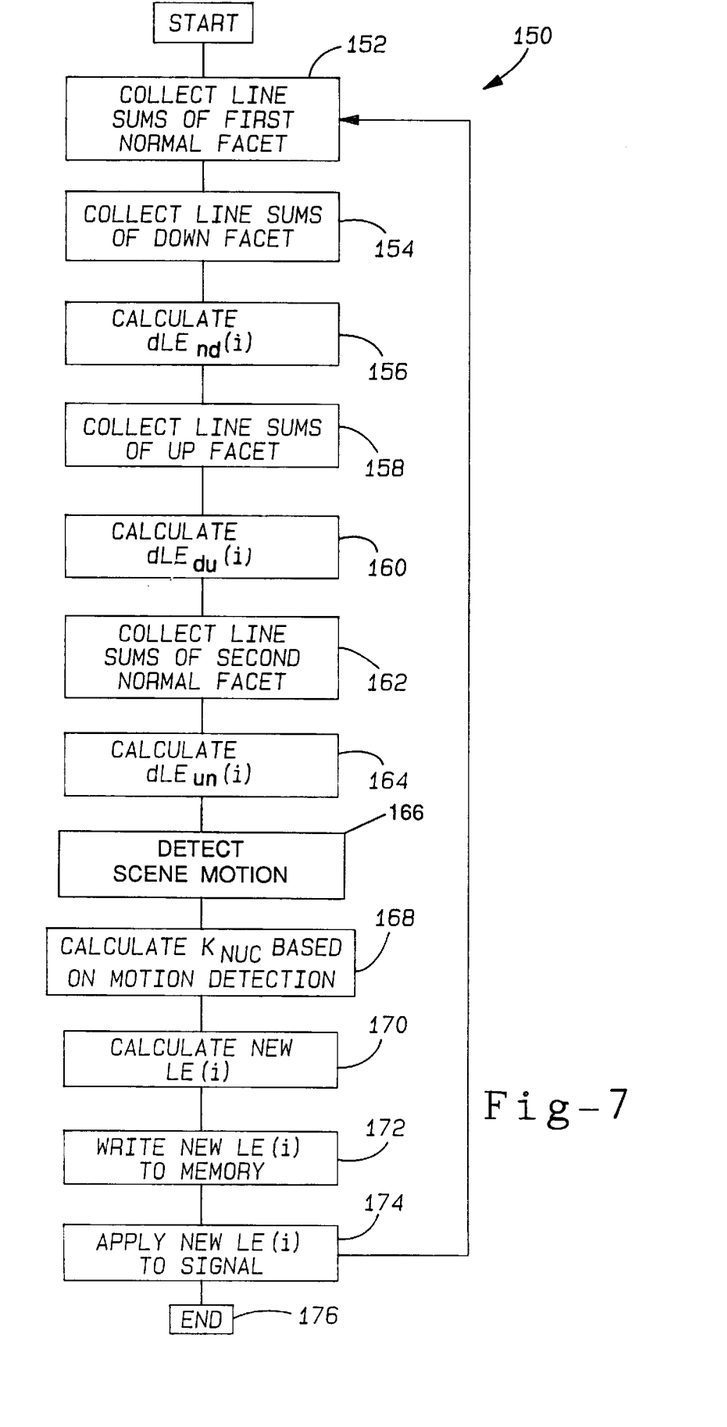
FIG. 7 is a flow diagram illustrating the preferred method of implementation of the scene-based non-uniformity correction system of the present invention.

Referring to FIG. 7, a preferred method of operation of the above described NUC system of the present invention is shown at 150. At step 152, the histogram chip 80 collects line sums of a first normal facet, such as the facet 23a. At step 154, the histogram chip collects line sums of a down facet, such as the facet 23e. At step 156, the system calculates the non-uniformity correction (NUC) factor dLE for normal-down scanner facet transitions. At step 158, the system collects line sums for the up facet, such as the facet 23c. At step 160, the system calculates the NUC factor for the down-up scanner facet transition. At step 162, the system collects line sums of a second normal facet, such as the facet 23g. At step 164, the system calculates the NUC factor.

At step 166, the system determines if the scene 14 has moved. At step 168, the system calculates a programmable loop gain k$_{NUC}$, dependent on whether or not scene motion is detected scene motion. Subsequently, new NUC values are calculated at step 170. At step 172, the new NUC values calculated at step 170 are written into system memory 62. At step 174, the new NUC values, applied to the input video signal. The system subsequently returns to line summing at step 152. However, if the application is over, the method ends at step 176.

Upon reading the foregoing detailed description, it should be appreciated that implementation of the non-uniformity correction system of the present invention digitally corrects detector array channel voltage non-uniformities based only on scene information thereby enhance video output signal quality. This eliminates the hardware components associated with prior art thermal reference source-based non-uniformity correction systems. Thus, by minimizing the number of hardware components needed to implement the system, overall system cost and complexity is reduced.

Moreover, because the present invention includes provisions for detecting and eliminating the effects of scene motion, signal quality is enhanced for systems that must operate in the presence of scene motion.

It should also be appreciated that, while the non-uniformity correction system of the present invention is implemented in a thermal imaging system application, it is contemplated that the non-uniformity correction system may also be implemented in any scanner-based video applications including visible line scanners.

Various other advantages of the present invention will become apparent to those skilled in the art after having the benefit of studying the foregoing text and drawings, taken in conjunction with the following claims.

What is claimed is:

1. A thermal imaging unit comprising:
   an array of detector elements responsive to energy from a detected target scene, said array having a plurality of output channels;
   a system for correcting signal non-uniformities on each of said plurality of output channels, comprising:

a signal input for inputting a video signal from said plurality of output channels carrying a target scene image;

a memory for storing non-uniformity correction commands;

a processor operative to implement said non-uniformity correction commands in response to detected non-uniformities in said video signal; and a non-uniformity corrector for adjusting detector array output channel levels, and for compensating for motion of the detected target scene, in response to said processor-implemented non-uniformity correction commands, before said video signal is output for viewing purposes.

2. The thermal imaging unit of claim 1, wherein said non-uniformity corrector comprises a signal summing means for summing lines of said video signal.

3. A multi-detector element imaging unit comprising:

an array of detector elements responsive to energy from a detected target scene, said array having a plurality of output channels;

a system for correcting signal non-uniformities on each of said plurality of output channels, comprising:

a signal input for inputting a video signal from said plurality of output channels carrying a target scene image;

a memory for storing non-uniformity correction commands;

a processor operative to implement said non-uniformity correction commands in response to detected non-uniformities in said video signal; and a non-uniformity corrector having an associated gain for adjusting detector array output channel levels in response to said processor-implemented non-uniformity correction commands; and motion detector means for adjusting said non-uniformity corrector to compensate for movement of said target scene, said motion detector means decreasing said gain of said non-uniformity corrector upon detecting movement of said target scene.

4. An imaging method, comprising the steps of:

storing non-uniformity correction commands;

detecting energy from a target scene via a detector array;

inputting a video signal from the detector array carrying a target scene image, said video signal formed from the detected energy from the target scene;

detecting non-uniformities in the input video signal;

correcting non-uniformities in the input video signal through implementation of the stored non-uniformity correction commands; and compensating for movement of the detected target scene during said step of correcting signal non-uniformities to increase accuracy of said step of correcting signal non-uniformities during movement of the target scene.

5. A military vehicle, comprising:

a thermal imaging unit including optics for detecting a scene, and a display;

a system for producing a high quality scene image on said display, comprising:

a detector assembly including a plurality of detector elements each being sensitive to energy from said detected scene and each outputting an electric signal responsive to said detected scene energy, said detector assembly including a plurality of output channels;

processing means for monitoring signal levels of said plurality of output channels; and a signal adjuster coupled to said processing means and to said output channels for adjusting said signal levels of said plurality of output channels in response to said processing means detecting output channel level variations, said signal adjuster being operative to compensate for movement of said scene as said signal adjuster adjusts said signal levels of said plurality of output channels to increase the quality of the scene image.

6. The military vehicle of claim 5, wherein said plurality of output channels is multiplexed onto a plurality of thermal imaging unit channels fewer in number than said plurality of output channels.

7. The military vehicle of claim 5, further comprising a memory programmed with commands for controlling said signal levels of said plurality of output channels by said processing means.

8. The military vehicle of claim 5, wherein said signal adjuster comprises signal summing means for summing data lines in said plurality of output channels.

9. A method for correcting channel-to-channel non-uniformities in a thermal imaging system, comprising the steps of:

providing a scanner for scanning energy from a detected target scene onto a detector array, said detector array outputting signals on a plurality of output channels in response to said detected target scene energy, said scanner having at least two normal facets, an up facet and a down facet;

collecting line sums for each of said facets of said scanner;

calculating non-uniformity correction factors to be added to said signals on said plurality of output channels;

adding said non-uniformity correction factors to said signals on said plurality of output channels;

monitoring for movement of said detected target scene;

calculating a gain adjustment factor upon detection of motion of said target scene;

applying said gain adjustment factor to said non-uniformity correction factors to create adjusted non-uniformity correction factors; and applying said adjusted non-uniformity correction factors to said signals on said plurality of output channels.

10. The method of claim 9, wherein said step of collecting line sums for each of said facets comprises the steps of:

collecting line sums of a first of said normal facets;

collecting line sums of said down facet;

calculating line sums of said up facet; and collecting line sums of a second of said normal facets.

* * * * *